(12) United States Patent
Lee et al.

(10) Patent No.: US 8,031,662 B2
(45) Date of Patent: Oct. 4, 2011

(54) METHOD AND APPARATUS FOR SCHEDULING DATA CONSIDERING ITS POWER IN A COMMUNICATION SYSTEM

(75) Inventors: Hee-Kwang Lee, Anyang-si (KR); Jung-Won Kim, Seoul (KR); Jae-Ho Jeon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1034 days.

(21) Appl. No.: 11/862,754

(22) Filed: Sep. 27, 2007

(65) Prior Publication Data

US 2008/0075027 A1 Mar. 27, 2008

(30) Foreign Application Priority Data

Sep. 27, 2006 (KR) .................................. 94182-2006

(51) Int. Cl.
*H04Q 7/00* (2006.01)
(52) U.S. Cl. ......................... 370/329; 370/328; 370/342

(58) Field of Classification Search .......... 370/335–345, 370/235, 328–330, 436, 442, 468, 470; 455/450, 455/452.1
See application file for complete search history.

(56) References Cited

U.S. PATENT DOCUMENTS

| 7,072,413 | B2 * | 7/2006 | Walton et al. ................. 375/267 |
| 7,324,522 | B2 * | 1/2008 | Rosengard et al. ......... 370/395.4 |
| 7,912,005 | B2 * | 3/2011 | Lee et al. ...................... 370/329 |
| 2007/0060145 | A1 * | 3/2007 | Song et al. .................... 455/445 |
| 2007/0274253 | A1 * | 11/2007 | Zhang et al. .................. 370/328 |

FOREIGN PATENT DOCUMENTS

| EP | 1906548 A2 * | 4/2008 |
| WO | WO 2006/065069 | 6/2006 |
| WO | WO 2006/075870 | 7/2006 |

* cited by examiner

*Primary Examiner* — Chuong T Ho
(74) *Attorney, Agent, or Firm* — The Farrell Law Firm, P.C.

(57) ABSTRACT

A method for scheduling data in a communication system having a downlink frame structure including power control regions of a boosting region for boosting power of a data burst, a normal region for keeping power of the data burst, and a deboosting region for deboosting power of the data burst.

22 Claims, 14 Drawing Sheets

METHOD AND APPARATUS FOR SCHEDULING DATA CONSIDERING ITS POWER IN A COMMUNICATION SYSTEM

PRIORITY

This application claims priority under 35 U.S.C. §119(a) to a Korean Patent Application filed in the Korean Intellectual Property Office on Sep. 27, 2006 and assigned Serial No. 2006-94182, the disclosure of which is incorporated herein by reference.

BACKGROUND OF THE INVENTION

1. Field of the Invention

The present invention relates generally to a method and apparatus for scheduling data considering power of the data in a communication system.

2. Description of the Related Art

Intensive research on the $4^{th}$ Generation (4G) communication system, or the next generation communication system, is being conducted to provide to users services having various Quality of Service (QoS) classes at a data rate of about 100 Mbps. In particular, active research into the 4 G communication system is being conducted to support high-speed services by guaranteeing mobility and QoS for a Broadband Wireless Access (BWA) communication system such as a wireless Local Area Network (LAN) system and a wireless Metropolitan Area Network (MAN) system, and an Institute of Electrical and Electronics Engineers (IEEE) 802.16 communication system is a typical BWA communication system.

The IEEE 802.16 communication system employs Orthogonal Frequency Division Multiplexing (OFDM)/Orthogonal Frequency Division Multiple Access (OFDMA) to support broadband transmission networks for physical channel of the wireless MAN system. OFDM/OFDMA can transmit multiple subcarriers with orthogonality being kept therebetween, thereby obtaining the optimal transmission efficiency during fast data transmission. In addition, OFDM/OFDMA, as it is high in frequency efficiency and robust against multi-path fading, can obtain the optimal transmission efficiency during fast data transmission. Further, OFDM/OFDMA, as it uses frequency spectra in an overlapping manner, is high in frequency efficiency, is robust against frequency selective fading and multi-path fading, can reduce Inter-Symbol Interference (ISI) using a guard interval, and can be designed with an equalizer having a simple hardware structure. The communication system employing OFDM/OFDMA can include Wireless Broadband Internet (WiBro), or 2.3-GHz band Portable Internet Service.

The communication system employing OFDMA should appropriately distribute resources to increase channel utilization between multiple Mobile Stations (MSs), located in one cell, and a Base Station (BS). A subcarrier is one of the sharable resources in the communication system employing OFDMA, and the subcarriers are channelized. The optimal channel utilization is guaranteed depending on how the subcarriers are assigned to the MSs in the cell using a predetermined scheme. Herein, a set of at least one subcarrier will be referred to as a subchannel.

Data transmission of the BWA communication system is achieved on a frame-by-frame basis, and each frame is divided into an interval capable of transmitting downlink data and an interval capable of transmitting uplink data. The uplink/downlink data intervals each are divided again into the frequency axis and the time axis. Each element formed in a two-dimensional arrangement of the frequency axis and the time axis is called a 'slot'.

Therefore, for assignment of downlink data bursts for MSs, the BS uses MAPs defined as normal MAPs or new normal MAPs (also known as Hybrid Automatic Repeat reQuest (H-ARQ) MAPs). The data bursts are assigned in the downlink data interval over multiple time slots. The BS performs power boosting or power deboosting on the assigned data bursts, thereby increasing the downlink resource utilization. In the BWA communication system standard, the power boosting/deboosting levels are defined as −12, −9, −6, −3, 0, 3, 6, 9, 12 dB.

However, a power assignment algorithm of performing the optimal power boosting/deboosting on the data bursts causes a very complex programming problem, so it can be hardly realized in the actual communication system.

SUMMARY OF THE INVENTION

Specifically, the conventional technology has presented no detailed scheme capable of assigning the data bursts in the frame, and the conventional BS downlink resource assignment assigns resources in the rectangular shape simply in QoS priority order without considering the size of the bursts and the number of null-padded slots, thereby causing a waste of the slots.

An aspect of the present invention is to address at least the problems and/or disadvantages discussed above and to provide at least the advantages described below. Accordingly, an aspect of the present invention is to provide a downlink resource assignment method for minimizing the number of slots wasted during BS downlink resource assignment, and improving the cell coverage area or cell capacity by boosting power of bursts to be assigned to an edge cell user whose Carrier-to-Interference Noise Ratio (CINR) is less than a first threshold for separating a boosting region from a normal region, and deboosting power of bursts to be assigned to a near cell user whose CINR is greater than a second threshold for separating the normal region from a deboosting region.

Another aspect of the present invention is to provide a downlink resource assignment method capable of reducing its implementation complexity.

According to one aspect of the present invention, there is provided a method for scheduling data in a communication system having a downlink frame structure including power control regions of a boosting region for 3 dB boosting power of a data burst, a normal region for keeping power of the data burst, and a deboosting region for −3 dB deboosting power of the data burst. The data scheduling method includes comparing a Carrier-to-Interference Noise Ratio (CINR) of a first data burst to be transmitted to a Mobile Station (MS) with a predetermined threshold to determine a first region indicative of a power control region of the first data burst; checking a power control region of a first Packet Data Unit (PDU) indicative of a PDU with a minimum Quality of Service (QoS) priority, among PDUs constituting the first data burst, if a minimum total number of subchannels necessary for transmitting a total number of slots for transmission of the first data burst that underwent power control for the first region, is greater than or equal to a predetermined maximum number of subchannels per symbol; determining a minimum number Fo of subchannels of the first data burst in a second region such that Fo is less than or equal to the maximum number of subchannels per symbol, considering a minimum number of subchannels of remaining power control regions except for the second region indicative of the checked power control region of the first PDU; and assigning data bursts to be transmitted to the MS in order of size such that a number of null-padded slots is minimized when there is any slot to which data bursts are to be assigned.

According to another aspect of the present invention, there is provided a system for scheduling data in a communication system having a downlink frame structure including power control regions of a boosting region for 3 dB boosting power of a data burst, a normal region for keeping power of the data burst, and a deboosting region for −3 dB deboosting power of the data burst. The data scheduling system includes a Base Station (BS) for comparing a Carrier-to-Interference Noise Ratio (CINR) of a first data burst to be transmitted to a Mobile Station (MS) with a predetermined threshold to determine a first region indicative of a power control region of the first data burst; checking a power control region of a first Packet Data Unit (PDU) indicative of a PDU with a minimum Quality of Service (QoS) priority, among PDUs constituting the first data burst, if a minimum total number of subchannels necessary for transmitting a total number of slots for transmission of the first data burst that underwent power control for the first region, is greater than or equal to a predetermined maximum number of subchannels per symbol; determining a minimum number Fo of subchannels of the first data burst in a second region such that Fo is less than or equal to the maximum number of subchannels per symbol, considering a minimum number of subchannels of remaining power control regions except for the second region indicative of the checked power control region of the first PDU, and assigning data bursts to be transmitted to the MS in order of size such that a number of null-padded slots is minimized when there is any slot to which data bursts are to be assigned.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
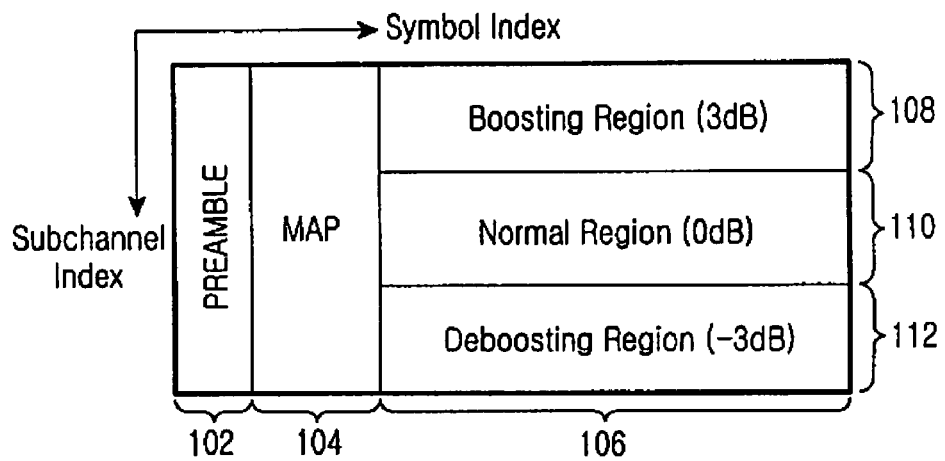
FIG. 1 illustrates a downlink frame structure of a BWA communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method and system for assigning resources in a communication system, for example, an Institute of Electrical and Electronics Engineers (IEEE) 802.16e communication system, or a Broadband Wireless Access (BWA) communication system. Although an embodiment of the present invention will be described herein with reference to the IEEE 802.16d/e communication system employing Orthogonal Frequency Division Multiplexing (OFDM)/Orthogonal Frequency Division Multiple Access (OFDMA), by way of example, the resource assignment method and system provided by the present invention can be applied to other communication systems.

In addition, the present invention provides a resource assignment method and system for data transmission between a transmitter, or a Base Station (BS), in charge of the cell, and a receiver, or a Mobile Station (MS), receiving a communication service from the transmitter in the communication system. To efficiently assign, in a predetermined downlink frame, downlink data bursts for data transmission to MSs, the BS herein transmits resource assignment information to the MSs over a MAP message. Herein, a MAP message used for transmitting downlink resource assignment information is referred to as a DownLink-MAP (DL-MAP) message, and a MAP message used for transmitting uplink resource assignment information is referred to as a UpLink-MAP (UL-MAP) message. When the BS transmits downlink resource assignment information and uplink resource assignment information over a DL-MAP message and a UL-MAP message, the MSs can each detect positions of resources assigned thereto and control information of the data that they should receive, by decoding the DL-MAP message and the UL-MAP message transmitted by the BS. By detecting the resource assignment positions and control information, the MSs can receive/transmit data over the downlink and uplink. In the BWA communication system, data transmission/reception is performed on a frame-by-frame basis, and the frame is divided into a region for transmitting downlink data, and a region for transmitting uplink data. The regions for transmitting the data are formed in a two-dimensional arrangement of 'frequency domain'×'time domain', and each element in the two-dimensional arrangement is defined as a slot, which is an assignment unit. That is, the frequency domain is divided into subchannels, each of which is a bundle of subcarriers, and the time domain is divided into symbols. The slot indicates a region in which one subchannel occupies the symbols. Each slot is assigned to only one arbitrary MS among the MSs located in one sector, and a set of slots assigned to the MSs located in one sector is a burst.

FIG. 1 illustrates a downlink frame structure of a BWA communication system according to an embodiment of the present invention.

Referring to FIG. 1, a downlink frame is divided into a preamble region 102, a MAP region 104, and a data burst assignment region 106. A preamble for synchronization acquisition is disposed in the preamble region 102, and the MAP region 104 includes a DL-MAP and a UL-MAP, each of which includes broadcast data information that the MSs commonly receive.

The data burst assignment region 106 is divided into a boosting region 108, in which downlink data bursts transmitted to MSs are assigned, for performing 3 dB power boosting on the bursts belonging to the corresponding region, a normal region 110 for performing no power boosting on the bursts belonging to the corresponding region, and a deboosting region 112 for performing −3 dB power boosting on the bursts belonging to the corresponding region. Thresholds used for assigning corresponding bursts to the boosting region, the normal region and the deboosting region in a distributed manner follow the criterion defined by an upper scheduler. Specifically, for an edge cell user whose Carrier-to-Interference Noise Ratio (CINR) is less than a first threshold for separating the boosting region 108 from the normal region 110, power of the bursts to be assigned thereto is assigned to the boosting region 108. However, for a near cell user whose CINR is greater than a second threshold for separating the normal region 110 from the deboosting region 112, power of the bursts to be assigned thereto is assigned to the deboosting region 112. The position and assignment-relation information of the downlink data bursts is included in the DL-MAP of the MAP region 104.

The data burst assignment region 106 is divided along the horizontal time axis and the vertical frequency axis. The number of subchannels, indicating the optimal performance, for the case where Full Usage of Sub Channel (FUSC) and Partial Usage of Sub Channel (PUSC) are used in the divided regions, will now be determined.

Figure 2:
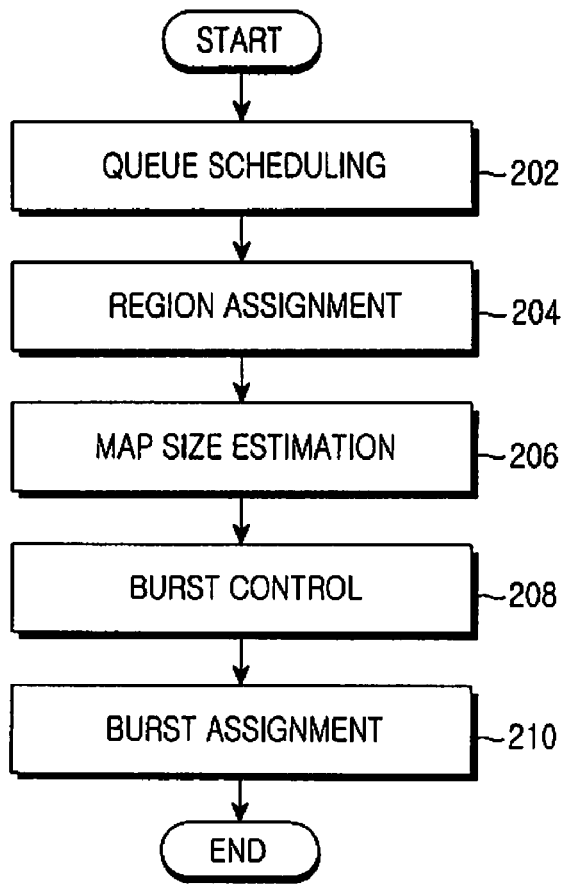
FIG. 2 illustrates a resource assignment procedure according to an embodiment of the present invention.

FIG. 2 illustrates a resource assignment procedure according to an embodiment of the present invention.

Referring to FIG. 2, in step 202, a BS performs queue scheduling for determining the priority of each individual connection for the data bursts that the BS will transmit separately for each service class. Herein, the data burst can be divided into an integer number of slots, and when the BS performs two-dimensional assignment of frequency and time on the data burst, consideration should be taken so that there is no slot wasted in the downlink frame. The downlink frame is divided along the frequency axis and the symbol axis (time axis), and has several slots that take both the frequency and the time into consideration.

In step 204, the BS performs region assignment for assigning, to a boosting region, power of bursts to be assigned to an edge cell user whose measured CINR is less than the first threshold, assigning, to a normal region, power of bursts to be assigned to a normal cell user whose CINR is greater than the first threshold and less than the second threshold, and assigning, to a deboosting region, power of bursts to be assigned to a near cell user whose CINR is greater than the second threshold.

In step 206, the BS determines a MAP size by estimating MAP overhead necessary for data bursts to be transmitted. Herein, the MAP size should be set to a large value when there are many data bursts to be transmitted. However, the increase in the MAP size reduces the data burst region size. Therefore, the MAP size and the data burst region size should be properly determined on a trade-off basis.

In step 208, the BS performs data burst concatenation for configuring one burst using the data bursts being transmitted to the same MS, or the data bursts having the same Modulation and Coding Scheme (MCS) level, to minimize the MAP overhead. The MCS are various combinations of modulation schemes and coding schemes, and multiple MCSs with level 1 to level N can be defined according to the number of MCSs.

In step 210, the BS assigns data bursts received in transmission priority order, in the data burst region of the downlink frame according to a predetermined rule.

Figure 3A:
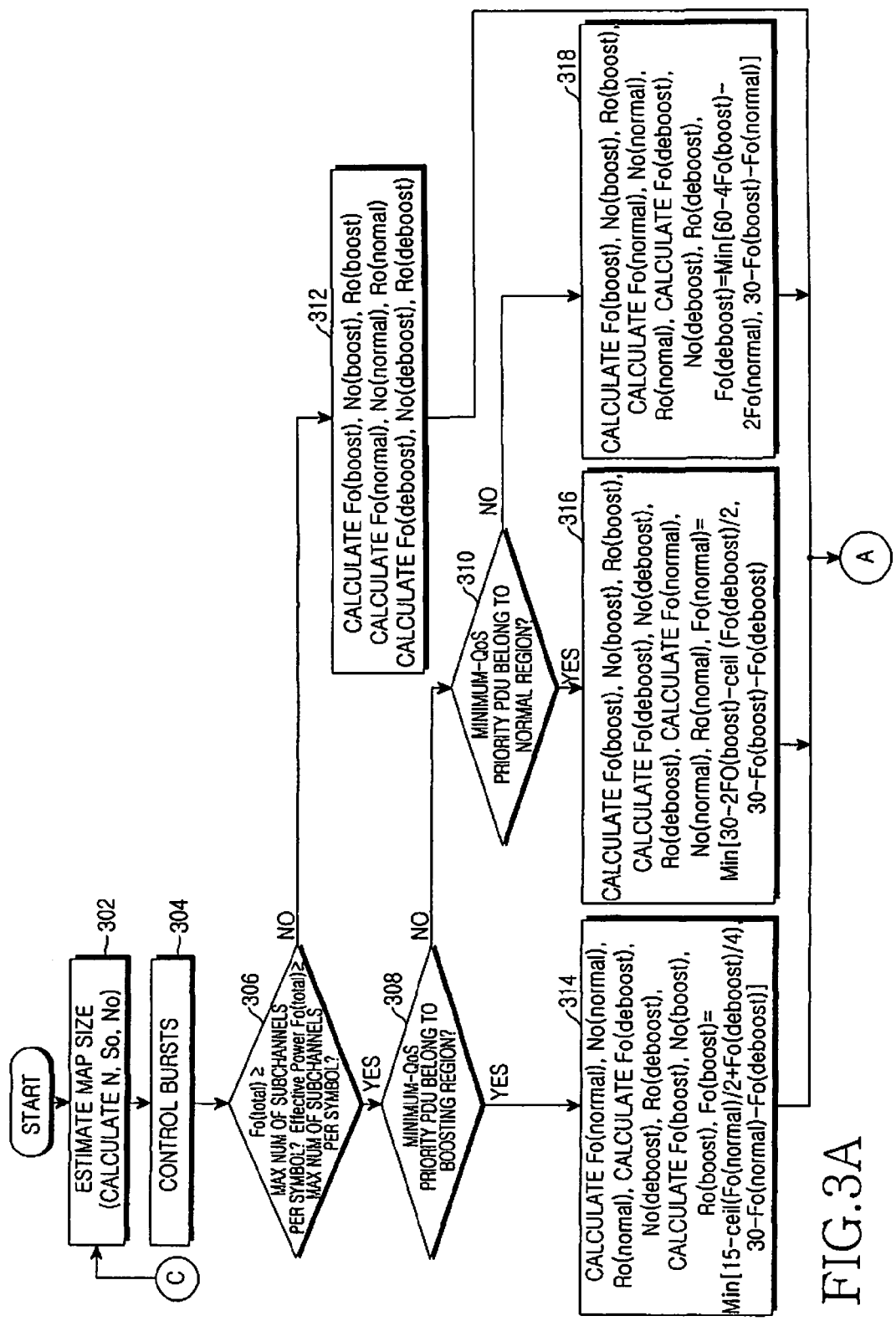
FIGS. 3A to 3C illustrate a burst assignment procedure of a BS, in which power boosting/deboosting is taken into consideration, according to an embodiment of the present invention.
Figure 3B:
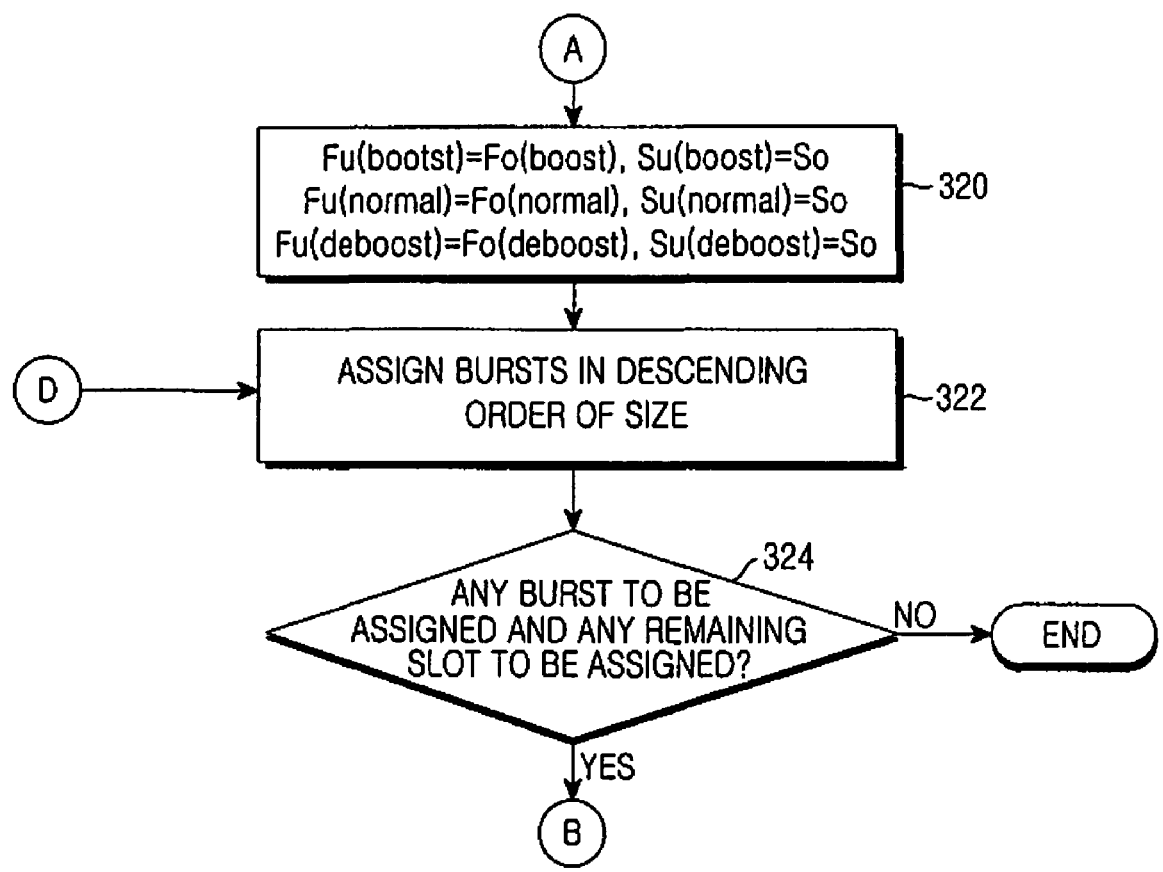
Figure 3C:
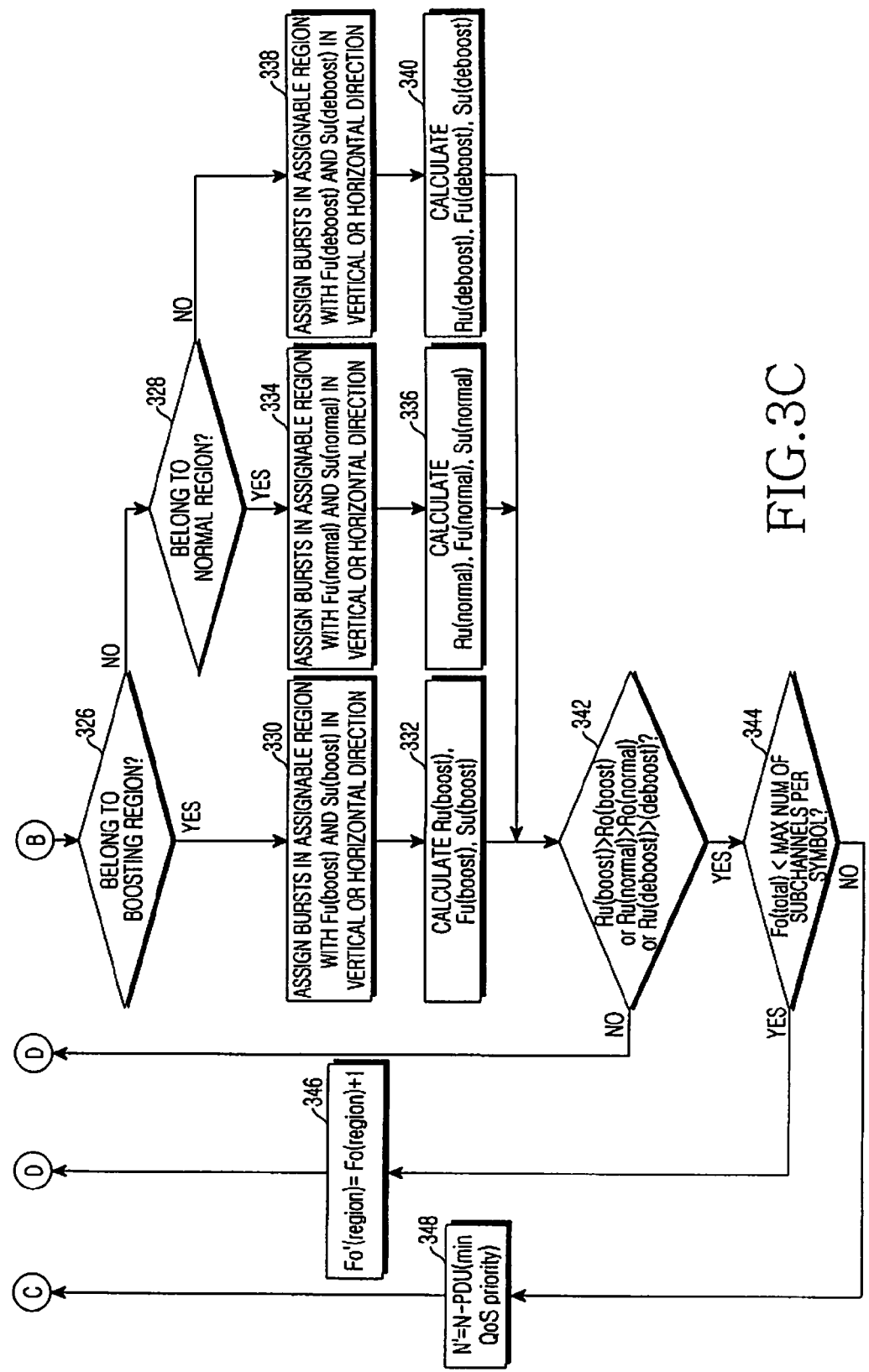

FIGS. 3A to 3C illustrate a burst assignment procedure of a BS, in which power boosting/deboosting is taken into consideration, according to an embodiment of the present invention.

Before a description of the burst assignment procedure is given, Table 1 shows parameters for a WiBro downlink burst assignment algorithm that considers power boosting.

TABLE 1

| | Description |
|---|---|
| N | Total number of slots that should be transmitted (Total Slot) |
| N(boost) | Total number of slots to be assigned to boosting region |
| N(normal) | Total number of slots to be assigned to normal region |
| N(deboost) | Total number of slots to be assigned to deboosting region |
| Effective Power N(boost) | 'Total number of slots to be assigned to boosting region' * 2 |
| Effective Power N(normal) | 'Total number of slots to be assigned to normal region' * 1 |
| Effective Power N(deboost) | 'Total number of slots to be assigned to deboosting region' * 0.5 |
| No(boost) | Maximum number of slots transmittable in boosting region of DL subframe determined through MAP size estimation |
| No(normal) | Maximum number of slots transmittable in normal region of DL subframe determined through MAP size estimation |
| No(deboost) | Maximum number of slots transmittable in deboosting region of DL subframe determined through MAP size estimation |
| Fo(boost) | Minimum number of subchannels necessary for transmitting N(boost) |
| Fo(normal) | Minimum number of subchannels necessary for transmitting N(normal) |
| Fo(deboost) | Minimum number of subchannels necessary for transmitting N(deboost) |
| Effective Power Fo(boost) | Minimum number of subchannels necessary for transmitting Effective Power N(boost) |
| Effective Power Fo(normal) | Minimum number of subchannels necessary for transmitting Effective Power N(normal) |
| Effective Power Fo(deboost) | Minimum number of subchannels necessary for transmitting Effective Power N(deboost) |

TABLE 1-continued

| | Description |
|---|---|
| So | Number of initial data symbols ('number of symbols in downlink subframe' − 'number of preamble symbols' − 'number of MAP symbols') |
| Ro(boost) | Maximum allowable number of null-padded slots expected in boosting region |
| Ro(normal) | Maximum allowable number of null-padded slots expected in normal region |
| Ro(deboost) | Maximum allowable number of null-padded slots expected in deboosting region |
| Fu | Number of remaining subchannels (Remain Sub channel) |
| Su | Number of remaining symbols |
| Ru | Number of accumulated null-padded slots |

Referring to FIG. 3A, in step 302, the BS determines a MAP size by estimating MAP overhead necessary for data bursts to be transmitted. Herein, the MAP size should be set to a large value when there are many data bursts to be transmitted. However, the increase in the MAP size reduces the data burst region size. Therefore, the MAP size and the data burst region size should be properly determined on a trade-off basis. Further, the BS calculates N (total number of slots that should be transmitted), So (number of initial data symbols), No (maximum number of slots transmittable in DL subframe determined through MAP size estimation), and the number of DL MAP Information Elements (IEs).

In step 304, the BS performs, on each corresponding region, burst concatenation for configuring one burst using the data bursts being transmitted to the same MS, or the Packet Data Units (PDUs) having the same Modulation and Coding Scheme (MCS) level, to minimize the MAP overhead, and then proceeds to step 306. Specifically, the BS adjusts QoS priorities disordered due to the concatenation, and calculates size priorities to be used in the burst assignment algorithm. The MCS are various combinations of modulation schemes and coding schemes, and multiple MCSs with level 1 to level N can be defined according to the number of MCSs.

In step 306, the BS compares Fo(total) with the maximum number of subchannels per symbol, and compares Effective Power Fo(total) with the maximum number of subchannels per symbol. Herein, the Fo(total) is a sum of Fo(boost), Fo(normal) and Fo(deboost), and the Effective Power Fo(total) is a sum of Effective Power Fo(boost), Effective Power Fo(normal) and Effective Power Fo(deboost). As a result of the comparison, if the Fo(total) or Effective Power Fo(total) is greater than or equal to the maximum number of subchannels per symbol, the BS proceeds to step 308. However, if the Fo(total) or Effective Power Fo(total) is less than the maximum number of subchannels per symbol, the BS proceeds to step 312.

In step 308, the BS determines if a PDU with the minimum QoS priority (hereinafter referred to as a 'minimum-QoS priority PDU') belongs to a boosting region, and if the minimum-QoS priority PDU belongs to the boosting region, the BS proceeds to step 314. However, if the minimum-QoS priority PDU does not belong to the boosting region, the BS proceeds to step 310 where it determines if the minimum-QoS priority PDU belongs to a normal region. If it is determined that the minimum-QoS priority PDU belongs to the normal region, the BS proceeds to step 316, and if the minimum-QoS priority PDU does not belong to the normal region, the BS proceeds to step 318.

In each of steps 312 to 318, the BS calculates Fo(region), No(region) and Ro(region) of the corresponding regions using Equation (1), and then proceeds to step 320 (A).

$$Fo(\text{region}) = \text{ceil}(N(\text{region})/So)$$

$$No(\text{region}) = Fo(\text{region}) * So \qquad (1)$$

$$Ro(\text{region}) = Fo(\text{region}) * So - N(\text{region})$$

Specifically, in step 312, the BS calculates Fo, No and Ro of all regions. In steps 314 to 318, the BS calculates Fo, No and Ro of all regions. The Fo, No and Ro of the region to which the minimum-QoS priority PDU belongs are determined in a relative manner such that they should not exceed the maximum number of transmittable subchannels per symbol according to the Fo determined in other regions except for the region to which the minimum-QoS priority PDU belongs.

If the Fo(total) is greater than or equal to the maximum number of transmittable subchannels per symbol, i.e. in steps 314, 316 and 318, the BS calculates Fo of the region not including the minimum-QoS priority PDU as ceil(N/So). However, because the minimum-QoS priority PDU undergoes fragmentation, Fo of the region including the minimum-QoS priority PDU is determined as a minimum value using Equation (2) such that it should not exceed the maximum number of transmittable subchannels per symbol according to the Fo determined in other regions except for the region to which the minimum-QoS priority PDU belongs.

$$Fo(\text{boost}) = \text{Min}[15 - \text{ceil}(Fo(\text{normal})/2 + Fo(\text{deboost})/4),$$
$$30 - Fo(\text{normal}) - Fo(\text{deboost})]$$

$$Fo(\text{normal}) = \text{Min}[30 - 2Fo(\text{boost}) - \text{ceil}(Fo(\text{deboost})/2),$$
$$30 - Fo(\text{boost}) - Fo(\text{deboost})]$$

$$Fo(\text{deboost}) = \text{Min}[60 - 4(Fo(\text{boost}) - 2Fo(\text{normal}),$$
$$30 - Fo(\text{boost}) - Fo(\text{normal})] \qquad (2)$$

Referring to FIG. 3B, in step 320, the BS calculates Fu(region) and Su(region) of the corresponding regions using Equation (3), and then proceeds to step 322.

$$Fu(\text{region}) = Fo(\text{region})$$

$$Su(\text{region}) = So(\text{region}) \qquad (3)$$

In step 322, the BS assigns bursts in descending order of the size, and then proceeds to step 324 where the BS determines if there is any burst to be assigned and if there is any remaining slot. If there is any burst to be assigned and there is any remaining slot, the BS proceeds to step 326 (B). However, if there is no burst to be assigned or if there is no remaining slot, the BS ends the burst assignment.

Referring to FIG. 3C, in step 326, the BS determines if the burst to be assigned belongs to the boosting region. If the burst to be assigned does not belong to the boosting region, the BS proceeds to step 328, and if the burst to be assigned belongs to the boosting region, the BS proceeds to step 330 where it uses Fu(boost) and Su(boost) of the assignable boosting region. That is, to minimize the number of null-padded slots, the BS assigns the burst to be assigned in the increasing direction of the subchannel axis using the full Su(boost), or assigns the burst to be assigned in the increasing direction of the symbol axis using the full Fu(boost), and then proceeds to step 332 where the BS calculates Ru(boost), Fu(boost) and Su(boost), and then proceeds to step 342. In step 328, the BS determines if the burst to be assigned belongs to the normal region. If the burst to be assigned belongs to the normal region, the BS proceeds to step 334, and if the burst to be assigned does not belong to the normal region, the BS proceeds to step 338. In step 334, the BS uses Fu(normal) and Su(normal) of the assignable normal region. That is, to minimize the number of null-padded slots, the BS assigns the burst in the increasing direction of the subchannel axis using the full Su(normal), or assigns the burst in the increasing direction of the symbol axis using the full Fu(normal), and then proceeds to step 336 where it calculates Ru(normal), Fu(normal) and Su(normal), and then proceeds to step 342. In step 338, the BS uses (Fu(deboost) and Su(deboost) of the assignable deboosting region. That is, to minimize the number of null-padded slots, the BS assigns the burst in the increasing direction of the subchannel axis using the full Su(deboost), or assigns the burst in the increasing direction of the symbol axis using the full Fu(deboost), and then proceeds to step 340 where it calculates Ru(deboost), Fu(deboost) and Su(deboost), and then proceeds to step 342.

In step 342, the BS compares Ru(region) with Ro(region) of the corresponding regions in size. If the Ru(region) is less than or equal to the Ro(region) calculated in steps 312 to 318, the BS returns to step 322 (D), and if the Ru(region) is greater than the Ro(region) calculated in steps 312 to 318, the BS proceeds to step 344.

In step 344, the BS compares the Fo(total) with the maximum number of subchannels per symbol. Herein, the Fo(total) is a sum of Fo(boost), Fo(normal) and Fo(deboost). As a result of the comparison, if the Fo(total) is less than the maximum number of subchannels per symbol, the BS increases in step 346 the Fo(region) of the region in which the Ru(region) is greater than the Ro(region), by 'Fo(region)+1', i.e. 1, and then returns to step 322 (D).

However, if the Fo(total) is greater than or equal to the maximum number of subchannels per symbol, the BS removes one minimum-QoS priority PDU in step 348, and then returns to step 302 (C). Thereafter, in step 302, the BS does not include the PDU with the next QoS priority of the removed minimum QoS priority in calculating the N.

FIGS. 4A to 4D illustrate a BS's burst assignment procedure including burst fragmentation, in which power boosting/deboosting is taken into consideration, according to an embodiment of the present invention.

Figure 4A:
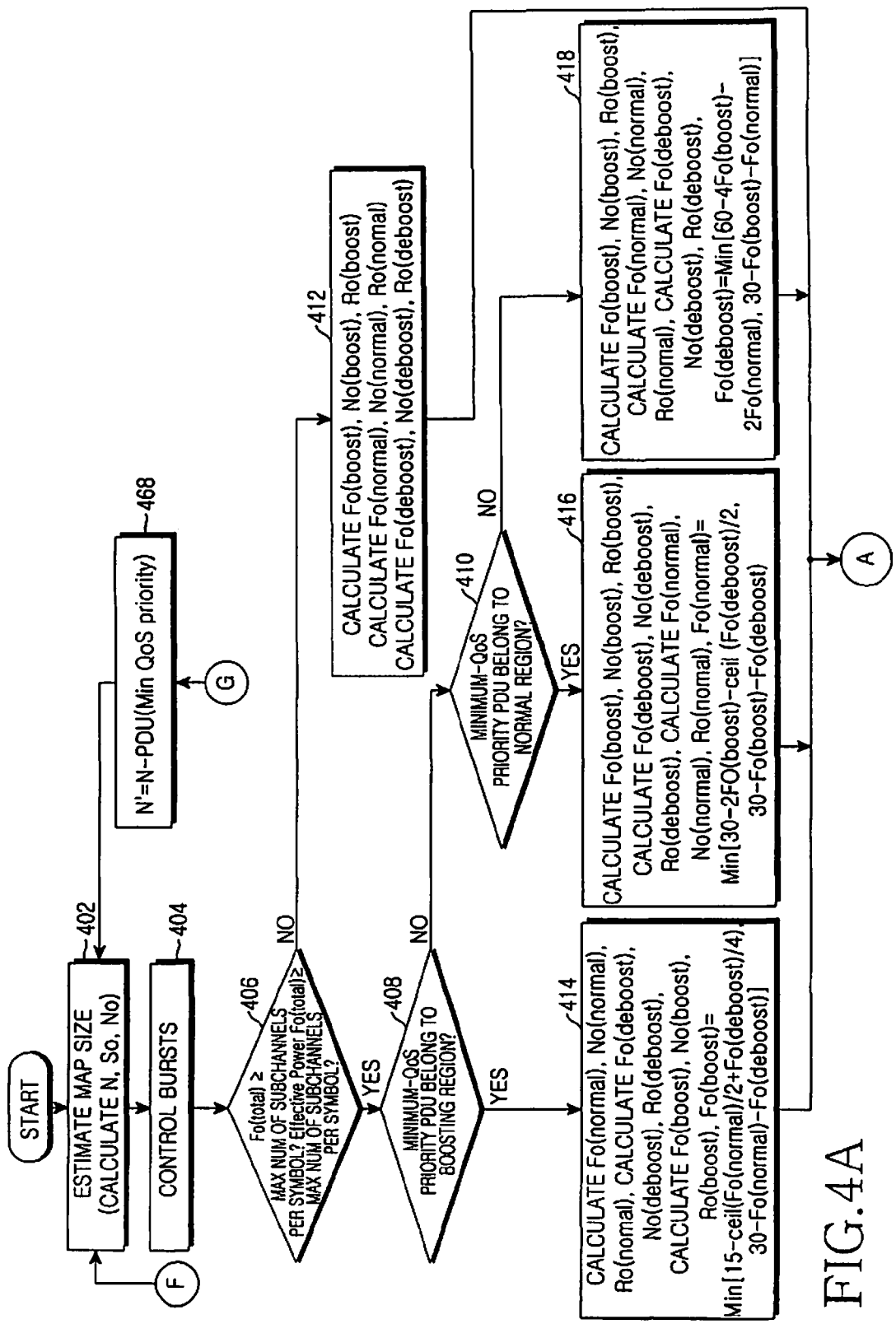
FIGS. 4A to 4D illustrate a BS's burst assignment procedure including burst fragmentation, in which power boosting/deboosting is taken into consideration, according to an embodiment of the present invention.

Referring to FIG. 4A, in step 402, the BS determines a MAP size by estimating MAP overhead necessary for data bursts to be transmitted, and then proceeds to step 404. Herein, the MAP size should be set to a large value when there are many data bursts to be transmitted. However, the increase in the MAP size reduces the data burst region size. Therefore, the MAP size and the data burst region size should be properly determined on a trade-off basis. Further, the BS calculates N (total number of slots that should be transmitted), So (number of initial data symbols), No (maximum number of slots transmittable in DL subframe determined through MAP size estimation), and the number of DL MAP IEs.

In step 404, the BS performs, on each corresponding region, burst concatenation for configuring one burst using the data bursts being transmitted to the same MS, or the PDUs having the same MCS level, to minimize the MAP overhead. Specifically, the BS adjusts QoS priorities disordered due to the concatenation, and calculates size priorities to be used in the burst assignment algorithm. The MCS are various combinations of modulation schemes and coding schemes, and multiple MCSs with level 1 to level N can be defined according to the number of MCSs.

In step 406, the BS compares Fo(total) with the maximum number of subchannels per symbol, and compares Effective Power Fo(total) with the maximum number of subchannels per symbol. Herein, the Fo(total) is a sum of Fo(boost), Fo(normal) and Fo(deboost), and the Effective Power Fo(total) is a sum of Effective Power Fo(boost), Effective Power Fo(normal) and Effective Power Fo(deboost). If the Fo(total) or Effective Power Fo(total) is greater than or equal to the maximum number of subchannels per symbol, the BS proceeds to step 408. However, if the Fo(total) or Effective Power Fo(total) is less than the maximum number of subchannels per symbol, the BS proceeds to step 412.

In step 408, the BS determines if the minimum-QoS priority PDU belongs to a boosting region. As a result of the check, if the minimum-QoS priority PDU belongs to the boosting region, the BS proceeds to step 414. However, if the minimum-QoS priority PDU does not belong to the boosting region, the BS proceeds to step 410 where it determines if the minimum-QoS priority PDU belongs to a normal region. If it is determined that the minimum-QoS priority PDU belongs to the normal region, the BS proceeds to step 416, and if the minimum-QoS priority PDU does not belong to the normal region, the BS proceeds to step 418.

In steps 412, 414, 416 and 418, the BS calculates Fo(region), No(region) and Ro(region) of all regions using Equation (1), and then proceeds to step 420 (A).

If the Fo(total) is greater than or equal to the maximum number of transmittable subchannels per symbol, i.e. in steps 414, 416 and 418, the BS calculates Fo of other regions not including the minimum-QoS priority PDU as ceil(N/So). However, because the minimum-QoS priority PDU undergoes fragmentation, Fo of the region including the minimum-QoS priority PDU is determined as the minimum value using Equation (2) such that it should not exceed the maximum number of subchannels per symbol according to the Fo determined in other regions.

Figure 4B:
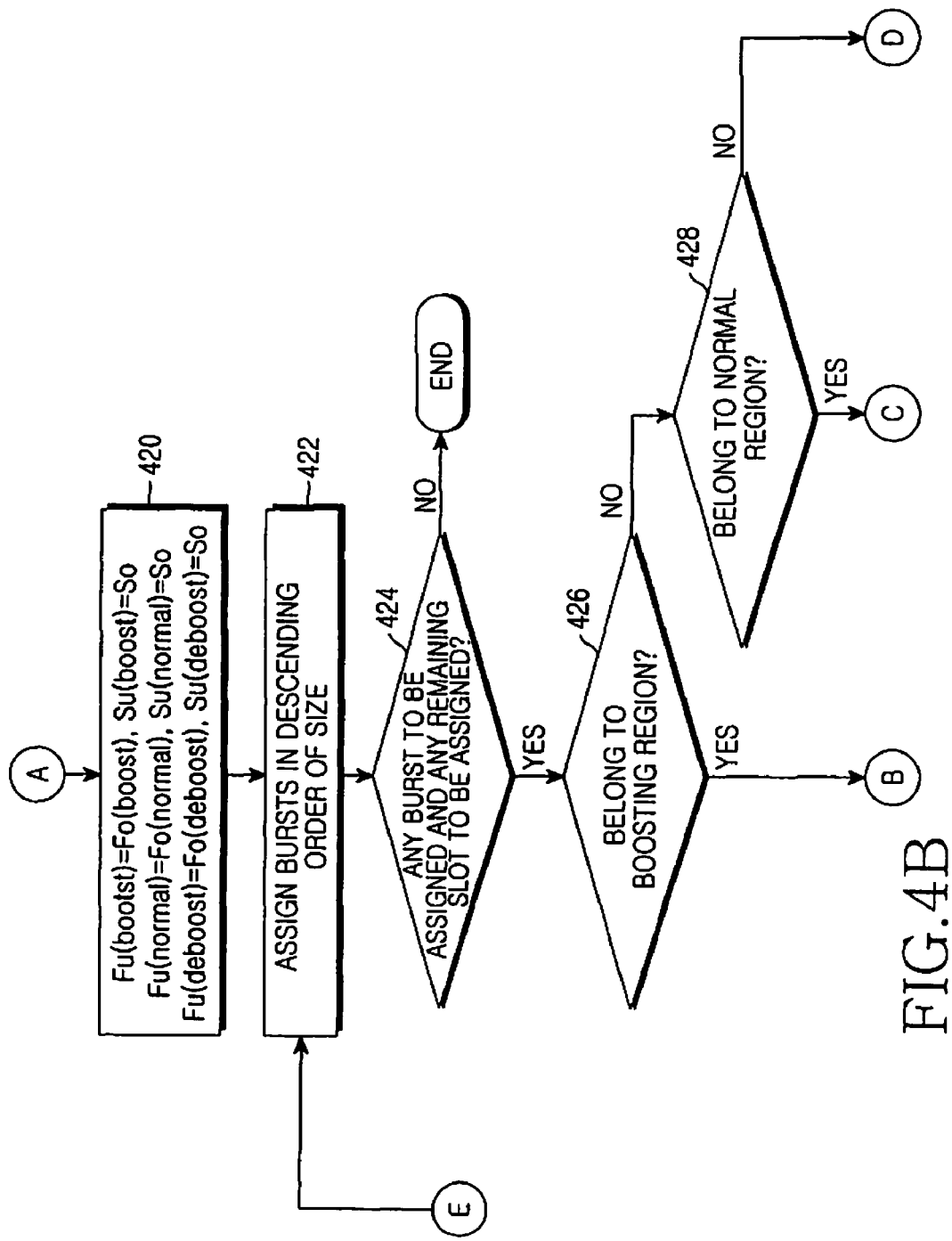

Referring to FIG. 4B, in step 420 (A), the BS calculates Fu(region) as Fo(region), and calculates Su(region) as So(region). In step 422 (E), the BS assigns bursts in descending order of the size, and then proceeds to step 424 where it determines if there is any burst to be assigned and if there is any remaining slot. If there is any burst to be assigned and if there is any remaining slot, the BS proceeds to step 426. However, if there is no burst to be assigned or if there is no remaining slot, the BS ends the burst assignment.

In step 426, the BS determines if the burst to be assigned belongs to the boosting region. If the burst to be assigned belongs to the boosting region, the BS proceeds to step 430 (B), and if the burst to be assigned does not belong to the boosting region, the BS proceeds to step 428 where it determines if the burst to be assigned belongs to the normal region. If the burst to be assigned belongs to the normal region, the BS proceeds to step 440 (C), and if the burst to be assigned does not belong to normal region, the BS proceeds to step 450 (D).

Figure 4C:
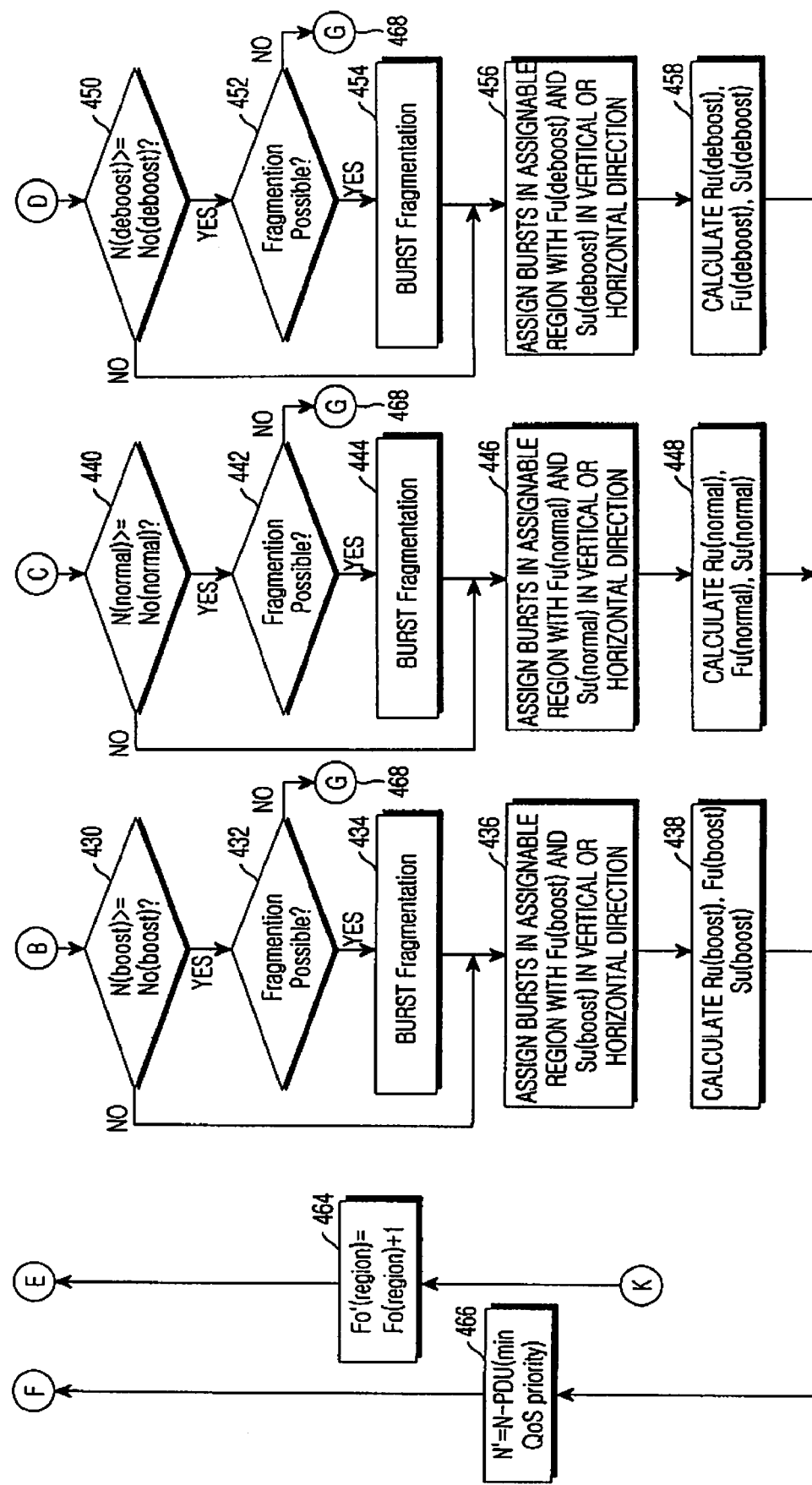

Referring to FIG. 4C, in step 430, the BS compares N(boost) with No(boost) in size. As a result of the comparison, if the N(boost) is less than the No(boost), the BS proceeds to step 436. However, if the N(boost) is greater than or equal to the No(boost), the BS determines in step 432 if the minimum-QoS priority burst can undergo fragmentation. If it is determined that the fragmentation is possible, the BS proceeds to step 434, and if the fragmentation is not possible, the BS proceeds to step 468 (G). In step 434, the BS performs fragmentation on the minimum-QoS priority burst estimated in steps 402 and 404. In the fragmentation process, the BS fragments the minimum-QoS priority burst such that it can be assigned according to the number of slots except for the slot to which bursts with a QoS priority greater than that of the minimum-QoS priority burst will be assigned. In step 436, the BS assigns the fragmented minimum-QoS priority burst using Fu(boost) and Su(boost) of the assignable boosting region. That is, to minimize the number of null-padded slots, the BS assigns the burst in the increasing direction of the subchannel axis using the full Su(boost), or assigns the burst in the increasing direction of the symbol axis using the full Fu(boost). In step 438, the BS calculates Ru(boost), Fu(boost) and Su(boost), and then proceeds to step 460 (H).

In step 440, the BS compares N(normal) with No(normal) in size. As a result of the comparison, if the N(normal) is greater than or equal to the No(normal), the BS proceeds to step 442, and if the N(normal) is less than the No(normal), the BS proceeds to step 446. In step 442, the BS determines if fragmentation of the minimum-QoS priority burst is possible. If the fragmentation is possible, the BS proceeds to step 444, and if the fragmentation is not possible, the BS proceeds to step 468 (G). In step 444, the BS performs fragmentation on the minimum-QoS priority burst estimated in steps 402 and 404. In the fragmentation process, the BS fragments the minimum-QoS priority burst such that it can be assigned according to the number of slots except for the slot to which bursts with a QoS priority greater than that of the minimum-QoS priority burst will be assigned. In step 446, the BS assigns the fragmented minimum-QoS priority burst using Fu(normal) and Su(normal) of the assignable normal region. That is, to minimize the number of null-padded slots, the BS assigns the burst in the increasing direction of the subchannel axis using the full Su(normal), or assigns the burst in the increasing direction of the symbol axis using the full Fu(normal). In step 448, the BS calculates Ru(normal), Fu(normal) and Su(normal), and then proceeds to step 460 (H).

In step 450, the BS compares N(deboost) with No(deboost) in size. As a result of the comparison, if the N(deboost) is greater than or equal to the No(deboost), the BS proceeds to step 452, and if the N(deboost) is less than the No(deboost), the BS proceeds to step 456. In step 452, the BS determines if fragmentation of the minimum-QoS priority burst is possible. If the fragmentation is not possible, the BS proceeds to step 468 (G), and if the fragmentation is possible, the BS proceeds to step 454 where it performs fragmentation on the minimum-QoS priority burst estimated in steps 402 and 404, and then proceeds to step 456. In the fragmentation process, the BS fragments the minimum-QoS priority burst such that it can be assigned according to the number of slots except for the slot to which bursts with a QoS priority greater than that of the minimum-QoS priority burst will be assigned. In step 456, the BS assigns the fragmented minimum-QoS priority burst using Fu(deboost) and Su(deboost) of the assignable deboosting region. That is, to minimize the number of null-padded slots, the BS assigns the burst in the increasing direction of the subchannel axis using the full Su(deboost), or assigns the burst in the increasing direction of the symbol axis using the full Fu(deboost). In step 458, the BS calculates Ru(deboost), Fu(deboost) and Su(deboost), and then proceeds to step 460 (H).

Figure 4D:
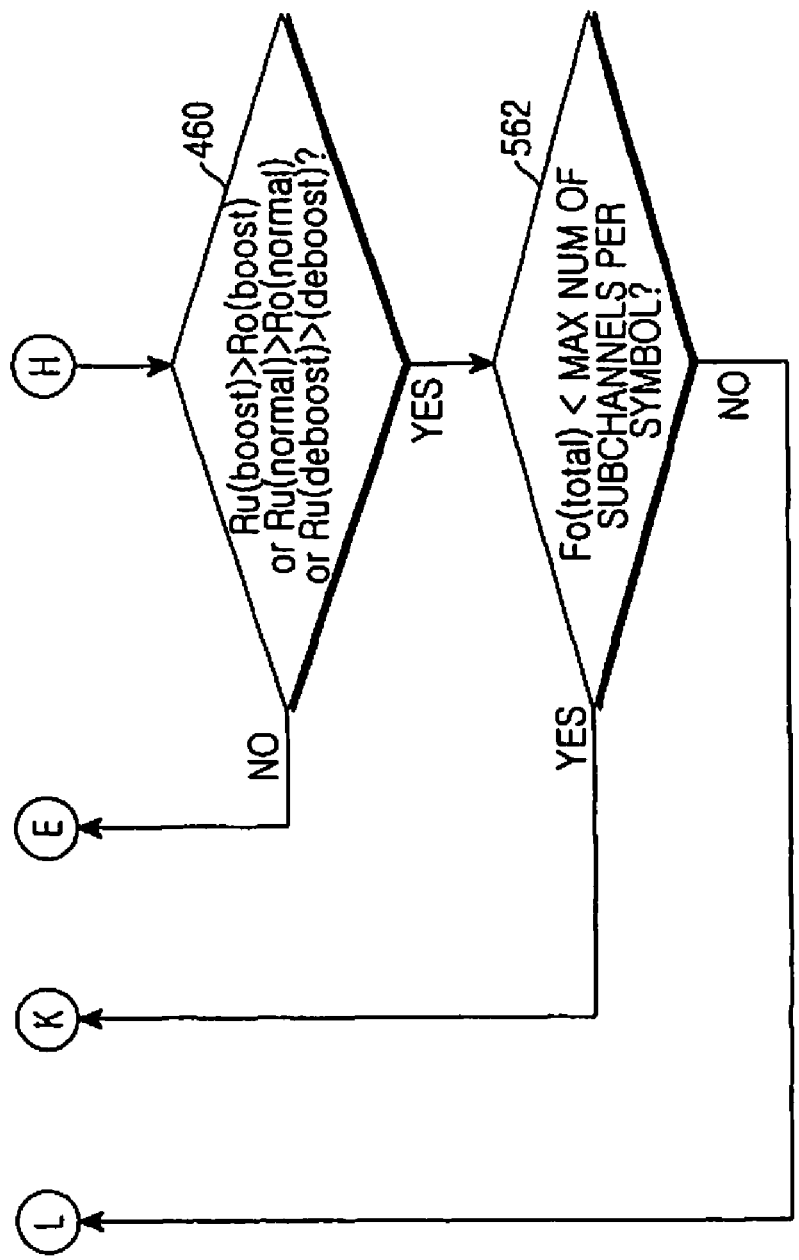

Referring to FIG. 4D, in step 460 (H), the BS compares Ru(region) with Ro(region) in size. If the Ru(region) is less than or equal to the Ro(region) calculated in steps 412 to 418, the BS returns to step 422 (E), and if the Ru(region) is greater than the Ro(region) calculated in steps 412 to 418, the BS proceeds to step 462 where it compares the Fo(total) with the maximum number of subchannels per symbol. Herein, the Fo(total) is a sum of Fo(boost), Fo(normal) and Fo(deboost). If the Fo(total) is less than the maximum number of subchannels per symbol, the BS proceeds to step 464 (K) where it increases the Fo(region) of the region in which Ru(region) of the corresponding region is greater than Ro(region), by 1, and then returns to step 422 (E). However, if the Fo(total) is greater than or equal to the maximum number of subchannels per symbol, the BS removes one minimum-QoS priority PDU in step 466 (L), and then returns to step 402 (F) In this case, in step 402 (F), the BS does not include the PDU with the next QoS priority of the removed minimum QoS priority in calculating the N.

In step 468 (G), the BS removes one minimum-QoS priority PDU, and then returns to step 402 (F). In this case, in step 402 (F), the BS includes the PDU with the next QoS priority of the removed minimum QoS priority in calculating the N.

FIGS. 5A to 5D illustrate a BS's burst assignment procedure including burst fragmentation and an algorithm for filling the remaining slot, in which power boosting/deboosting is taken into consideration, according to an embodiment of the present invention.

Figure 5A:
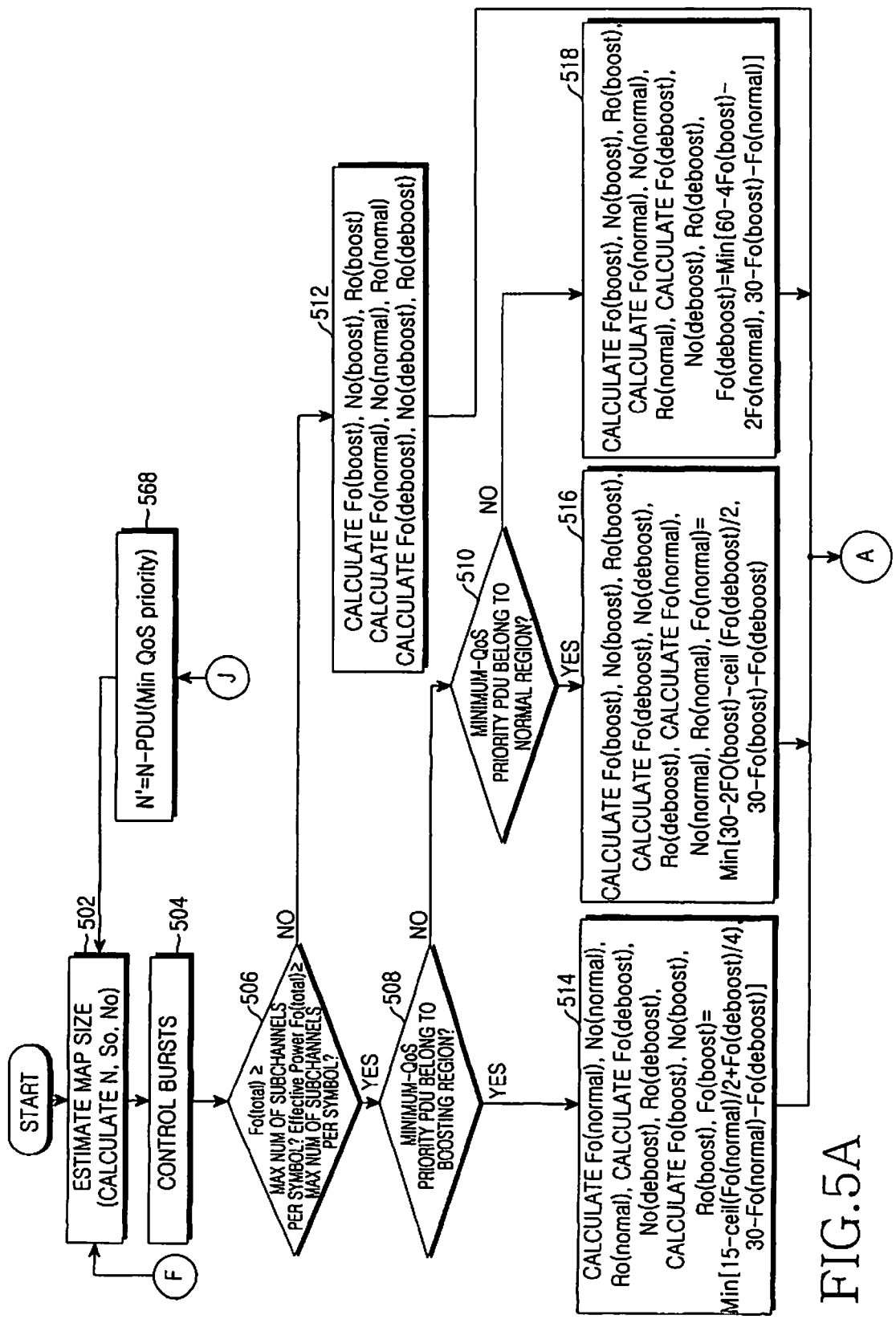
FIGS. 5A to 5D illustrate a BS's burst assignment procedure including burst fragmentation and an algorithm for filling the remaining slot, in which power boosting/deboosting is taken into consideration, according to an embodiment of the present invention.

Referring to FIG. 5A, in step 502 (F), the BS determines a MAP size by estimating MAP overhead necessary for data bursts to be transmitted. Herein, the MAP size should be set to a large value when there are many data bursts to be transmitted. However, the increase in the MAP size reduces the data burst region size. Therefore, the MAP size and the data burst region size should be properly determined on a trade-off basis. Further, the BS calculates N (total number of slots that should be transmitted), So (number of initial data symbols), No (maximum number of slots transmittable in DL subframe determined through MAP size estimation) and the number of DL MAP IEs.

In step 504, the BS performs, on each corresponding region, burst concatenation for configuring one burst using the data bursts being transmitted to the same MS, or the PDUs having the same MCS level, to minimize the MAP overhead. Specifically, the BS adjusts QoS priorities disordered due to the concatenation, and calculates size priorities to be used in the burst assignment algorithm. The MCS is combinations of modulation schemes and coding schemes, and multiple MCSs with level 1 to level N can be defined according to the number of MCSs.

In step 506, the BS compares Fo(total) with the maximum number of subchannels per symbol, and compares Effective Power Fo(total) with the maximum number of subchannels per symbol. Herein, the Fo(total) is a sum of Fo(boost), Fo(normal) and Fo(deboost), and the Effective Power Fo(total) is a sum of Effective Power Fo(boost), Effective Power Fo(normal) and Effective Power Fo(deboost). If the Fo(total) or Effective Power Fo(total) is greater than or equal to the maximum number of subchannels per symbol, the BS proceeds to step 508. However, if the Fo(total) or Effective Power Fo(total) is less than the maximum number of subchannels per symbol, the BS proceeds to step 512.

In step 508, the BS determines if the minimum-QoS priority PDU belongs to a boosting region. If the minimum-QoS priority PDU belongs to the boosting region, the BS proceeds to step 514. However, if the minimum-QoS priority PDU does not belong to the boosting region, the BS proceeds to step 510 where the BS determines if the minimum-QoS priority PDU belongs to a normal region. If the minimum-QoS priority PDU belongs to the normal region, the BS proceeds to step 516, and if the minimum-QoS priority PDU does not belong to the normal region, the BS proceeds to step 518.

Figure 5B:
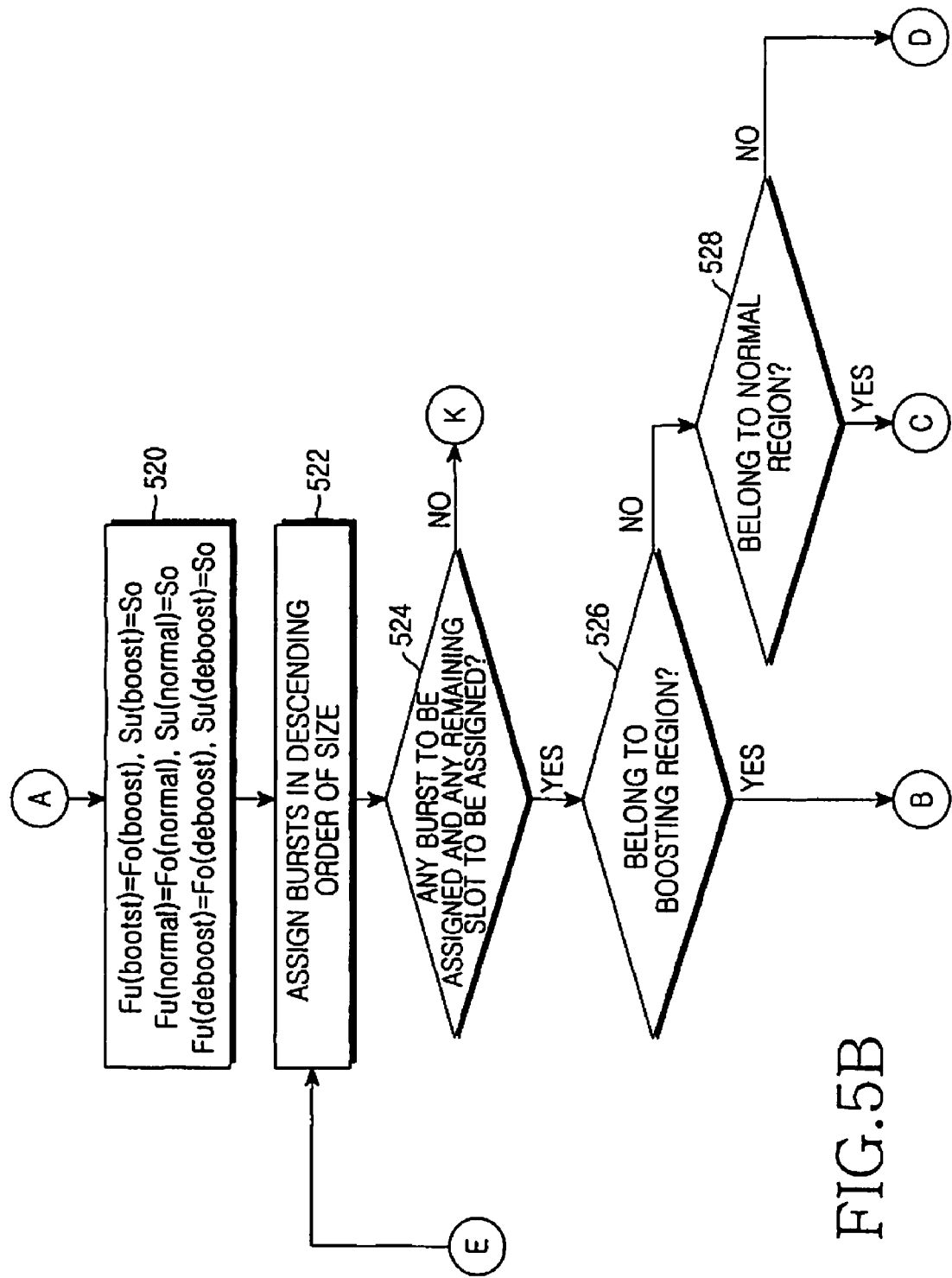

In steps 512, 514, 516 and 518, the BS calculates Fo(region), No(region) and Ro(region) of each region using Equation (1), and then proceeds to step 520 of FIG. 5B.

If the Fo(total) is greater than or equal to the maximum number of subchannels per symbol, i.e. in steps 514, 516 and 518, the BS calculates Fo of other regions not including the minimum-QoS priority PDU as ceil(N/So). However, because the minimum-QoS priority PDU undergoes fragmentation, Fo of the region including the minimum-QoS priority PDU is determined as the minimum value using Equation (2) in a relative manner such that it should not exceed the maximum number of subchannels per symbol according to the Fo determined in other regions except for the region to which minimum-QoS priority PDU belongs.

Referring to FIG. 5B, in step 520 (A), the BS calculates Fu(region) as Fo(region), and calculates Su(region) as So(region) using Equation (3).

In step 522, the BS assigns bursts in descending order of the size, and then checks in step 524 whether there is any burst to be assigned and there is any remaining slot. If there is any burst to be assigned and there is any remaining slot, the BS proceeds to step 526, and if there is no burst to be assigned or there is no remaining slot, the BS proceeds to step 602 (K) of FIG. 6

In step 526, the BS checks whether the burst to be assigned belongs to the boosting region. If it is determined that the burst to be assigned belongs to the boosting region, the BS proceeds to step 530 (B), and if the burst to be assigned does not belong to the boosting region, the BS proceeds to step 528 where the BS determines if the burst to be assigned belongs to the normal region. If the burst to be assigned belongs to the normal region, the BS proceeds to step 540 (C), and if the burst to be assigned does not belong to the normal region, the BS proceeds to step 550 (D).

Figure 5C:
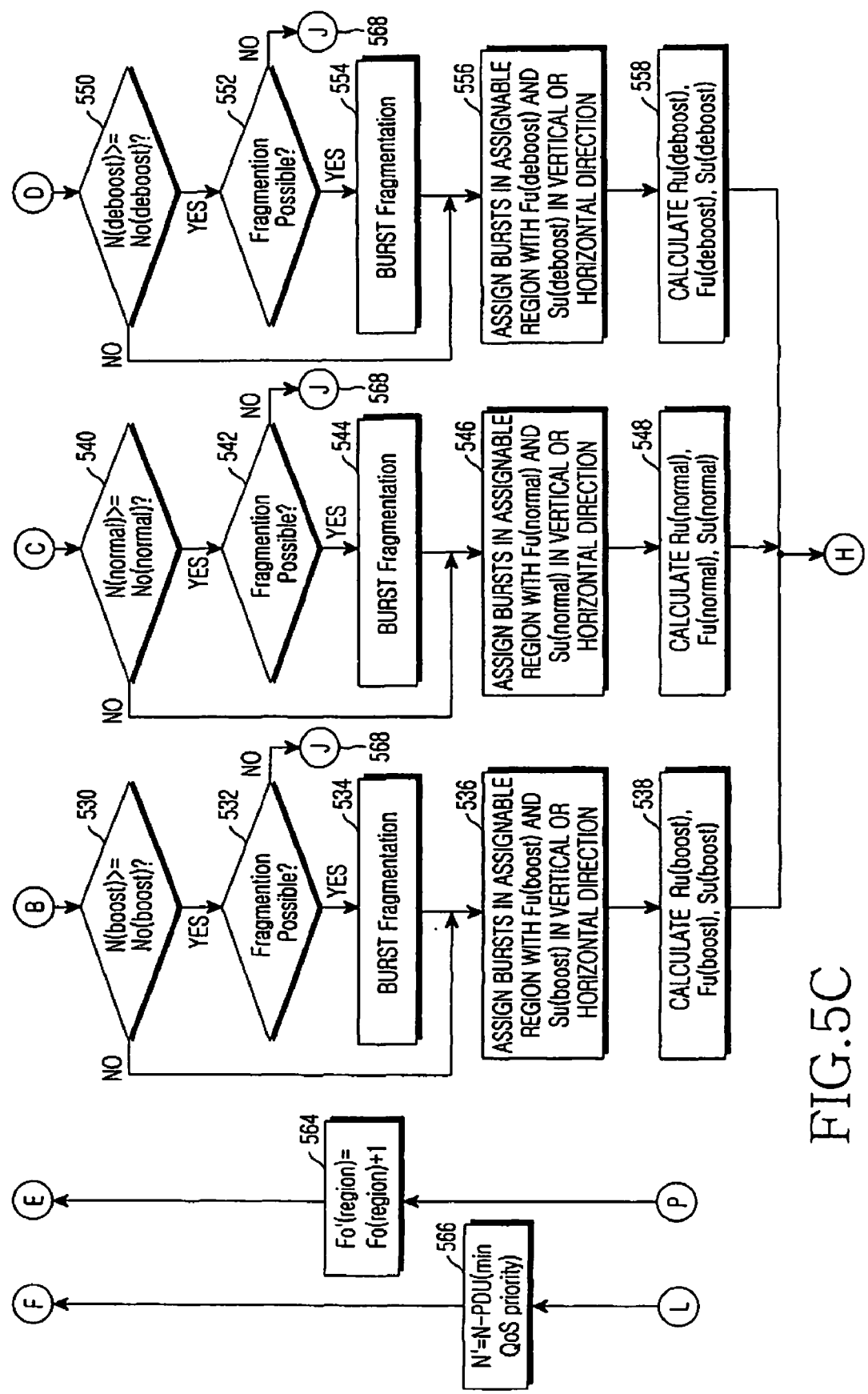

Referring to FIG. 5C, in step 530 (B), the BS compares N(boost) with No(boost) in size. As a result of the comparison, if the N(boost) is less than the No(boost), the BS proceeds to step 536. However, if the N(boost) is greater than or equal to the No(boost), the BS determines in step 532 if fragmentation of the minimum-QoS priority burst is possible. If it is determined that the fragmentation is possible, the BS proceeds to step 534, and if the fragmentation is not possible, the BS proceeds to step 568 (J). In step 534, the BS performs fragmentation on the minimum-QoS priority burst estimated in steps 502 and 504. In the fragmentation process, the BS fragments the minimum-QoS priority burst such that it can be assigned according to the number of slots except for the slot to which bursts with a QoS priority greater than that of the minimum-QoS priority burst will be assigned. In step 536, the BS assigns the fragmented minimum-QoS priority burst using Fu(boost) and Su(boost) of the assignable boosting region. That is, to minimize the number of null-padded slots, the BS assigns the burst in the increasing direction of the subchannel axis using the full Su(boost), or assigns the burst in the increasing direction of the symbol axis using the full Fu(boost). In step 538, the BS calculates Ru(boost), Fu(boost) and Su(boost), and then proceeds to step 560 (H).

In step 540 (C), the BS compares N(normal) with No(normal) in size. As a result of the comparison, if the N(normal) is greater than or equal to the No(normal), the BS proceeds to step 542, and if the N(normal) is less than the No(normal), the BS proceeds to step 546. In step 542, the BS determines if fragmentation of the minimum-QoS priority burst is possible. If it is determined that the fragmentation is possible, the BS proceeds to step 544, and if the fragmentation is not possible, the BS proceeds to step 568 (J). In step 544, the BS performs fragmentation on the minimum-QoS priority burst estimated in steps 502 (F) and 504. In the fragmentation process, the BS fragments the minimum-QoS priority burst such that it can be assigned according to the number of slots except for the slot to which bursts with a QoS priority greater than that of the minimum-QoS priority burst will be assigned. In step 546, the BS assigns the fragmented minimum-QoS priority burst using Fu(normal) and Su(normal) of the assignable normal region. That is, to minimize the number of null-padded slots, the BS assigns the burst in the increasing direction of the subchannel axis using the full Su(normal), or assigns the burst in the increasing direction of the symbol axis using the full Fu(normal). In step 548, the BS calculates Ru(normal), Fu(normal) and Su(normal), and then proceeds to step 560 (H).

In step 550 (D), the BS compares N(deboost) with No(deboost) in size. As a result of the comparison, if the N(deboost) is greater than or equal to the No(deboost), the BS proceeds to step 552, and if the N(deboost) is less than the No(deboost), the BS proceeds to step 556. In step 552, the BS determines if fragmentation of the minimum-QoS priority burst is possible. If the fragmentation of the minimum-QoS priority burst is not possible, the BS proceeds to step 568 (J), and if the fragmentation of the minimum-QoS priority burst is possible, the BS proceeds to step 554 where it performs fragmentation on the minimum-QoS priority burst estimated in steps 502 (F) and 504, and then proceeds to step 556. In the fragmentation process, the BS fragments the minimum-QoS priority burst such that it can be assigned according to the number of slots except for the slot to which bursts with a QoS priority greater than that of the minimum-QoS priority burst will be assigned. In step 556, the BS assigns the fragmented minimum-QoS priority burst using Fu(deboost) and Su(deboost) of the assignable deboosting region. That is, to minimize the number of null-padded slots, the BS assigns the burst in the increasing direction of the subchannel axis using the full Su(deboost), or assigns the burst in the increasing direction of the symbol axis using the full Fu(deboost). In step 558, the BS calculates Ru(deboost), Fu(deboost) and Su(deboost), and then proceeds to step 560 (H).

Figure 5D:
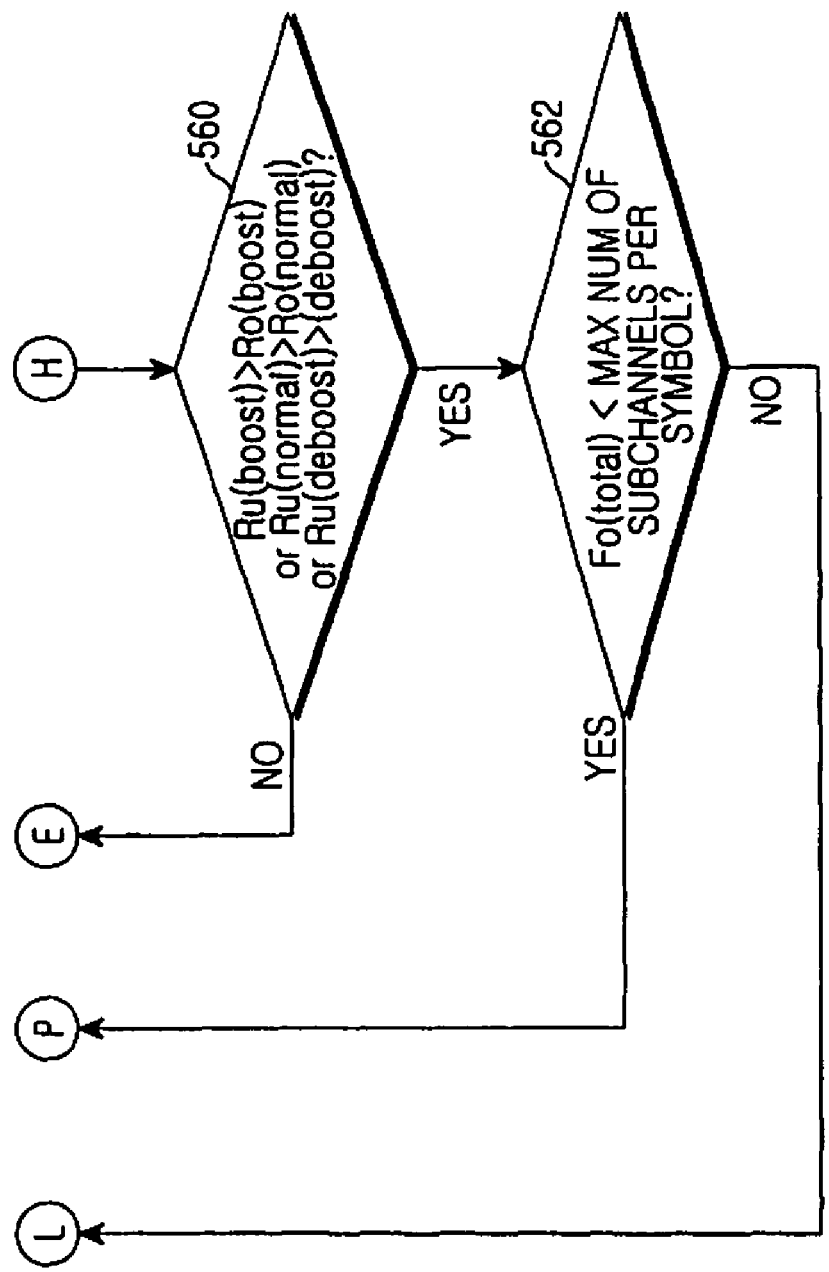

Referring to FIG. 5D, in step 560 (H), the BS compares Ru(region) with Ro(region) in size. If the Ru(region) is less than or equal to the Ro(region) calculated in steps 512 to 518, the BS returns to step 522 (E), and if the Ru(region) is greater than the Ro(region) calculated in steps 512 to 518, the BS proceeds to step 562 where it compares the Fo(total) with the maximum number of subchannels per symbol. Herein, the Fo(total) is a sum of Fo(boost), Fo(normal) and Fo(deboost). If the Fo(total) is less than the maximum number of subchannels per symbol, the BS increases in step 564 (P) the Fo(region) of the region in which the Ru(region) is greater than the Ro(region) of the corresponding region, by 1, and then returns to step 552 (E). However, if the Fo(total) is greater than or equal to the maximum number of subchannels per symbol, the BS removes one minimum-QoS priority PDU in step 566 (L) and then returns to step 502. In this case, in step 502 (F), the BS does not include the PDU with the next QoS priority of the removed minimum QoS priority in calculating the N.

In step 568 (J), the BS removes one minimum-QoS priority PDU, and then returns to step 502 (F). In this case, in step 502 (F), the BS includes the PDU with the next QoS priority of the removed minimum QoS priority in calculating the N.

Figure 6:
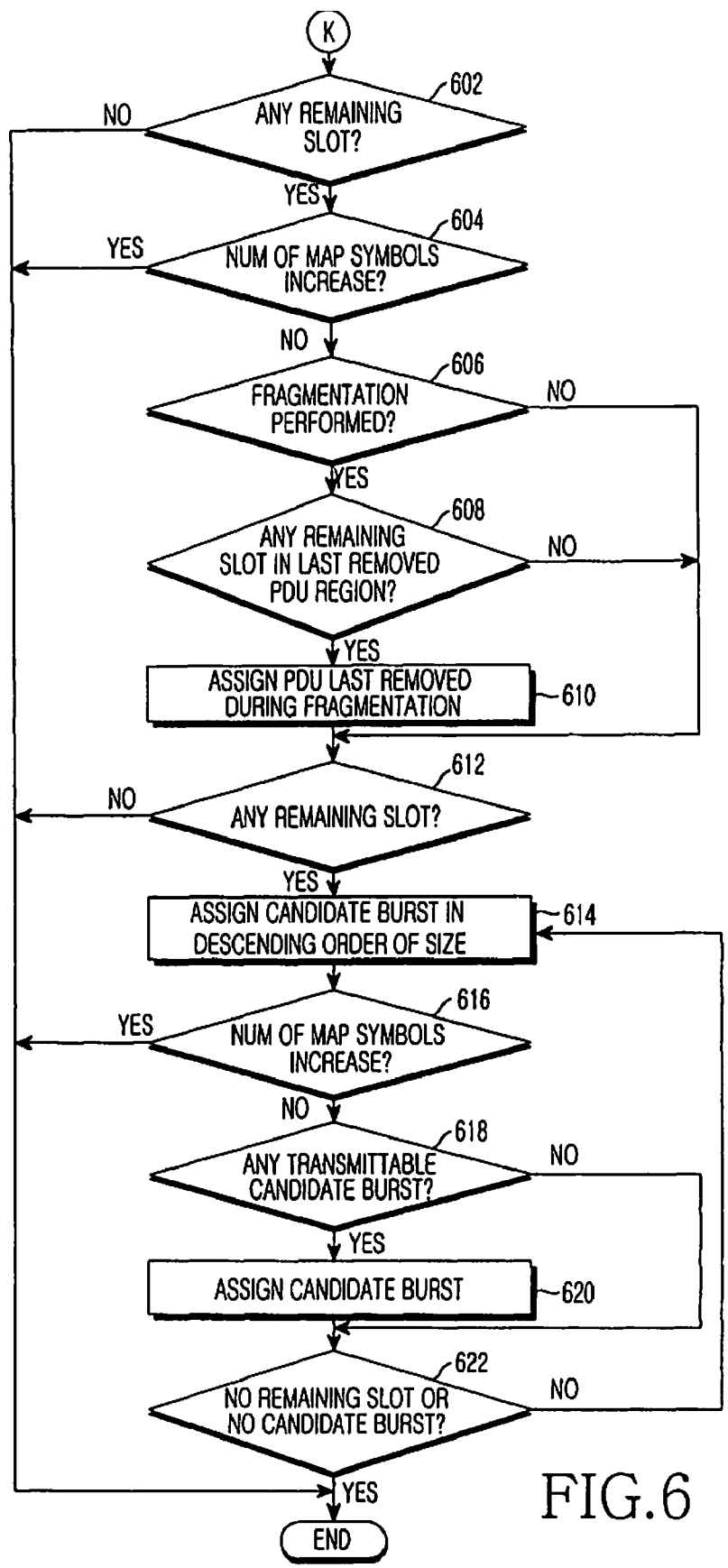
FIG. 6 illustrates a BS's burst assignment procedure including an algorithm for filling the remaining slot considering power boosting/deboosting according to an embodiment of the present invention.

Referring to FIG. 6, in step 602, the BS determines if there is any remaining slot, to which bursts are to be assigned, after completing the process of assigning the assignable bursts determined in steps 522 and 524 of FIG. 5B in the size order.

If there is no remaining slot to which bursts are to be assigned, the BS ends the burst assignment. However, if there is any remaining slot to which bursts are to be assigned, the BS determines in step 604 if the number of MAP symbols increases due to the DL MAP IE that it adds to supplementally assign bursts. If the number of MAP symbols increases, the BS ends the burst assignment. However, if the number of MAP symbols does not increase even though the BS supplementally assigns bursts, the BS determines in step 606 whether fragmentation was performed, i.e. whether step 566 (L) of FIG. 5C was performed. When step 566 (L) of FIG. 5C was performed, the BS proceeds to step 608, and when step 566 (L) of FIG. 5C was not performed, the BS proceeds to step 612.

In step 608, the BS determines if there are slots left in the region to which the last removed PDU has belonged. If there is no slot left in the region to which the last removed PDU has belonged, the BS proceeds to step 612. However, if there are slots left in the region to which the last removed PDU has belonged, the BS assigns in step 610 the PDU last removed in step 566 (L) of FIG. 5C, to the remaining slots, and then proceeds to step 612. If the number of the remaining slots is less than the last removed PDU, the BS determines if fragmentation of the PDUs is possible. Depending on the result, the BS fragments and assigns the last removed PDU, or discards it.

In step 612, the BS determines if there is any remaining slot to which bursts are to be assigned, even after the procedure of 602 to 610 for assigning the PDU removed in step 566 (L) of FIG. 5C to the remaining slot. If there is no remaining slot to which bursts are to be assigned, the BS ends the burst assignment. However, if there is any remaining slot to which bursts are to be assigned, the BS proceeds to step 614.

In step 614, the BS assigns a candidate burst in order of the region having a large number of remaining slots. The candidate burst is generated by concatenating PDUs with the same MCS level so that it can fully fill the remaining slot starting from the PDU having the highest QoS priority among the PDUs with the highest MCS level, left in the queue, except for the assignable PDUs determined in step 502 (F) of FIG. 5A.

In step 616, the BS determines if the number of MAP symbols increases due to the DL MAP IE added to supplementally assign bursts. If the number of MAP symbols increases when the BS supplementally assigns bursts, the BS ends the burst assignment. If the number of MAP symbols does not increase even though the BS supplementally assigns bursts, the BS proceeds to step 618 where it determines if there is any transmittable candidate burst in the corresponding region. If it is determined that there is any candidate burst, the BS assign in step 620 the candidate burst to the empty slots of the corresponding region, and then proceeds to step 622. If the number of remaining slots is less than the candidate burst, the BS determines if fragmentation of the candidate burst is possible. Depending on the result, the BS fragments and assigns the candidate burst, or discards it. However, if it is determined that there is no candidate burst, the BS determines in step 622 if there is any remaining slot to which data bursts are to be assigned and if there is any assignable candidate burst in the corresponding region. If it is determined that there is any remaining slot to which data bursts are to be assigned and if there is any assignable candidate burst in the corresponding region, the BS returns to step 614. However, if there is no remaining slot to which data bursts are to be assigned or if there is no assignable candidate burst in the corresponding region, the BS ends the burst assignment.

Figure 7:
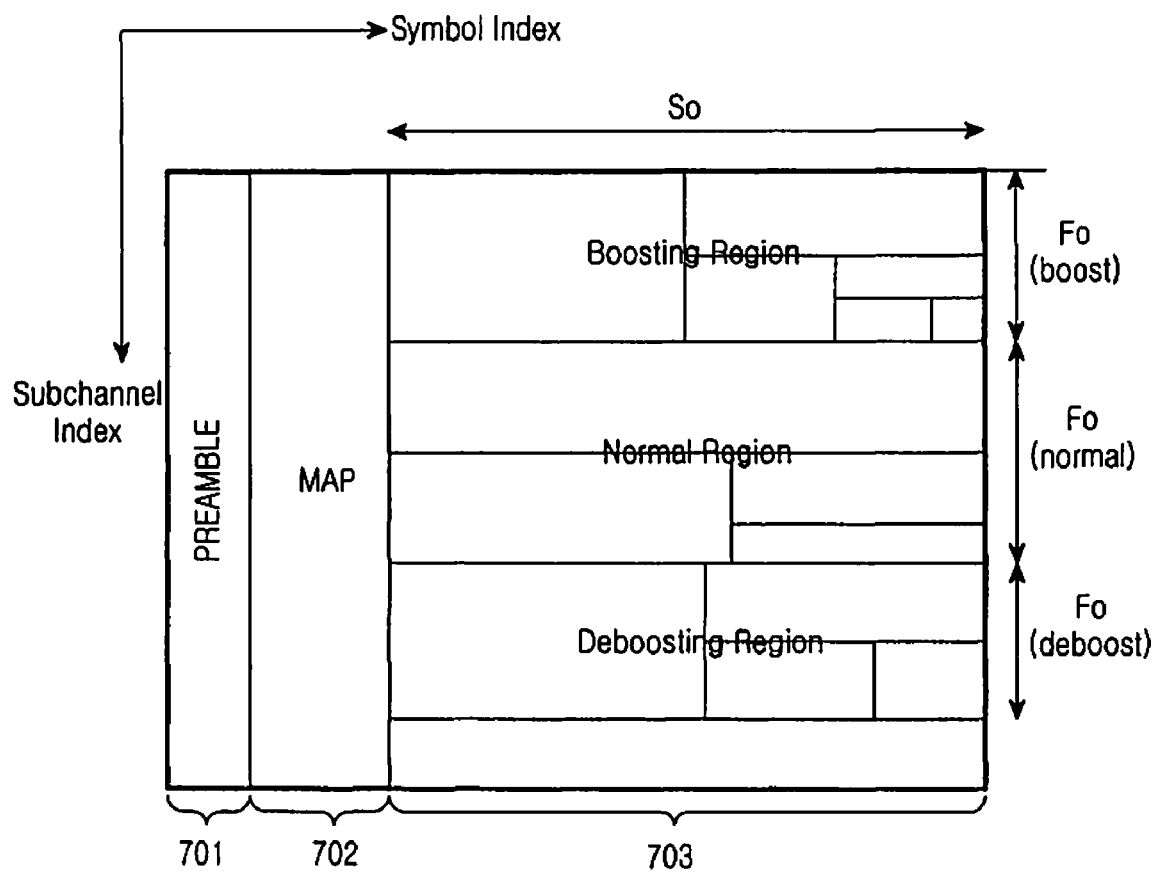
FIG. 7 illustrates an example of assigning bursts by a burst assignment algorithm considering power boosting/deboosting according to an embodiment of the present invention.

FIG. 7 illustrates an example of assigning bursts by a burst assignment algorithm considering power boosting/deboosting according to an embodiment of the present invention.

Referring to FIG. 7, the downlink frame is divided into a preamble region 701, a MAP region 702, and a data burst assignment region 703. When the boosting and deboosting regions are compared with the preamble of FIG. 1, it can be noted that bursts are not assigned including the wasted parts and some regions remain empty.

As can be appreciated from the foregoing description, the present invention efficiently assigns bursts in the burst assignment region of the downlink frame considering the burst size and the number of null-padded slots to minimize the wasted slots in the BWA communication system, thereby maximizing the entire resource efficiency of the system. In addition, the present invention performs burst concatenation for configuring one burst using the data bursts being transmitted to the same MS, or the PDUs having the same MCS level, thereby minimizing the MAP overhead. Further, the present invention can increase the cell coverage area or cell capacity, and reduce its implementation complexity in the manner of boosting power of the bursts to be assigned to an edge cell user whose CINR is less than the first threshold, and deboosting power of the bursts to be assigned to a near cell user whose CINR is greater than the second threshold, during burst assignment to the downlink frame.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for scheduling data in a communication system having a downlink frame structure including power control regions of a boosting region for boosting power of a data burst, a normal region for keeping power of the data burst, and a deboosting region for deboosting power of the data burst, the method comprising:
   comparing a Carrier-to-Interference Noise Ratio (CINR) of a first data burst to be transmitted to a Mobile Station (MS) with a threshold to determine a first region indicative of a power control region of the first data burst;
   checking a power control region of a first Packet Data Unit (PDU) indicative of a PDU with a minimum Quality of Service (QoS) priority, among PDUs constituting the first data burst, if a minimum total number of subchannels necessary for transmitting a total number of slots for transmission of the first data burst that underwent power control for the first region, is greater than or equal to a predetermined maximum number of subchannels per symbol;
   determining Fo, where Fo is a minimum number of subchannels of the first data burst in a second region, such that Fo is less than or equal to the maximum number of subchannels per symbol, considering a minimum number of subchannels of remaining power control regions excluding the second region indicative of the checked power control region of the first PDU; and
   assigning data bursts to be transmitted to the MS in order of size such that a number of null-padded slots is minimized when there is any slot to which data bursts are to be assigned.

2. The method of claim 1, wherein the determining of a first region further comprises:

comparing a minimum number of subchannels necessary for transmitting a total number of slots for transmission of the first data burst, with the maximum number of subchannels per symbol.

3. The method of claim 1, wherein the assigning comprises:
setting a minimum number of subchannels of the first data burst determined in the first region as Fu, where Fu is a number of subchannels that remains for assigning the first data burst in the first region;
setting Su, where Su is a number of symbols that remains for assigning the first data burst in the first region, using the following equation:

$Su$(region)='number of symbols in downlink subframe'−'number of preamble symbols'−'number of MAP symbols';

determining if there is any second data burst to be assigned and if there is any remaining slot to which data bursts are to be assigned; and
checking a power control region of the second data burst, and assigning the second data burst in an increasing direction of a subchannel axis or in an increasing direction of a symbol axis using Fu and Su of a second region indicative of a power control region of the checked second data burst.

4. The method of claim 3, wherein the assigning further comprises:
comparing Ru, where Ru is a number of accumulated null-padded slots of each of the boosting region, the normal region and the deboosting region of the second data burst, with Ro, where Ro is a maximum allowable number of null-padded slots estimated in each of the boosting region, the normal region and the deboosting region, and determining if Fo is less than the maximum number of subchannels per symbol if Ru of at least one region is greater than Ro of the region;
if Fo is less than the maximum number of subchannels per symbol, increasing, by one, a minimum number of subchannels necessary for transmitting a total number of slots for transmission of the second data burst in the power control region of the second data burst in which Ru is greater than Ro; and
if Fo is greater than or equal to the maximum number of subchannels per symbol, subtracting a number of slots from a total number of slots for transmitting the second data burst, wherein the number of slots corresponds to a second PDU indicative of a minimum-priority PDU of the second data burst.

5. The method of claim 1, wherein the threshold includes a first threshold for separating the boosting region from the normal region, and a second threshold for separating the normal region from the deboosting region.

6. The method of claim 5, wherein the determining of a first region further comprises:
assigning the first data burst in the boosting region if the CINR of the MS is less than the first threshold;
assigning the first data burst in the normal region if the CINR of the MS is greater than the first threshold and less than the second threshold; and
assigning the first data burst in the deboosting region if the CINR of the MS is greater than the second threshold.

7. The method of claim 3, wherein the assigning further comprises:
checking a power control region of the second data burst if there is a second data burst to be assigned and there is a slot to which data bursts are to be assigned;
determining if a second PDU indicative of a PDU with a minimum QoS priority of the second data burst can undergo segmentation, if N, where N is a number of slots for transmitting the second data burst in a third region indicative of a power control region of the checked second data burst, is greater than or equal to No, where No is a maximum number of slots transmittable in the third region; and
segmenting the second PDU if the second PDU can undergo segmentation.

8. The method of claim 7, wherein the determining if a second PDU can undergo segmentation further comprises:
if the second PDU cannot undergo segmentation, subtracting a number of slots corresponding to the second PDU from a total number of slots for transmitting the second data burst.

9. The method of claim 7, wherein the determining if a second PDU can undergo segmentation further comprises:
if the second PDU cannot undergo segmentation, determining if a number of MAP symbols increases during assignment of the second data burst, when there is any remaining slot to which the second data burst is to be assigned;
if the number of MAP symbols does not increases, determining if a number of slots corresponding to the second PDU is subtracted from a total number of slots for transmitting the second data burst;
if the number of slots corresponding to the second PDU is subtracted from the total number of slots, assigning the second PDU to a remaining slot when there is the remaining slot to which no data burst is assigned in the third region indicative of the power control region of the second PDU; and
if there is a remaining slot, assigning a candidate data burst to the remaining slot in order of size.

10. The method of claim 9, further comprising:
after assigning the candidate data burst, if the number of MAP symbols does not increase, determining if there is another candidate data burst transmittable to the MS; and
if there is another candidate data burst and if there is a remaining slot, assigning the another candidate data burst to the remaining slot.

11. The method of claim 9, wherein the candidate data burst is generated by concatenating PDUs with a same MCS level among PDUs with a highest MCS level of a data burst to be transmitted to the MS, in an order of a PDU with a highest QoS priority to a PDU with the lowest QoS priority.

12. A system for scheduling data in a communication system having a downlink frame structure including power control regions of a boosting region for boosting power of a data burst, a normal region for keeping power of the data burst, and a deboosting region for deboosting power of the data burst, the system comprising:
a Base Station (BS) for comparing a Carrier-to-Interference Noise Ratio (CINR) of a first data burst to be transmitted to a Mobile Station (MS) with a threshold to determine a first region indicative of a power control region of the first data burst;
checking a power control region of a first Packet Data Unit (PDU) indicative of a PDU with a minimum Quality of Service (QoS) priority, among PDUs constituting the first data burst, if a minimum total number of subchannels necessary for transmitting a total number of slots for transmission of the first data burst that underwent power control for the first region, is greater than or equal to a predetermined maximum number of subchannels per symbol;

determining Fo, where Fo is a minimum number of subchannels of the first data burst in a second region, such that Fo is less than or equal to the maximum number of subchannels per symbol, considering a minimum number of subchannels of remaining power control regions excluding the second region indicative of the checked power control region of the first PDU; and assigning data bursts to be transmitted to the MS in order of size such that a number of null-padded slots is minimized when there is any slot to which data bursts are to be assigned.

13. The system of claim 12, wherein the BS compares a minimum number of subchannels necessary for transmitting a total number of slots for transmission of the first data burst, with the maximum number of subchannels per symbol.

14. The system of claim 12, wherein the BS:
sets a minimum number of subchannels of the first data burst determined in the first region as Fu, where Fu is a number of subchannels left for assigning the first data burst in the first region, and sets Su, where Su is a number of symbols left for assigning the first data burst in the first region using the following equation:

$Su(\text{region}) = \text{'number of symbols in downlink subframe'} - \text{'number of preamble symbols'} - \text{'number of MAP symbols'}$ and determines if there is any second data burst to be assigned and there is any remaining slot to which data bursts are to be assigned, checks a power control region of the second data burst, and assigns the second data burst in an increasing direction of a subchannel axis or in an increasing direction of a symbol axis using Fu and Su of a second region indicative of a power control region of the checked second data burst.

15. The system of claim 14, wherein the BS:
compares Ru, where Ru is a number of accumulated null-padded slots of each of the boosting region, the normal region and the deboosting region of the second data burst, with Ro, where Ro is a maximum allowable number of null-padded slots estimated in each of the boosting region, the normal region and the deboosting region, and determines if Fo is less than the maximum number of subchannels per symbol if Ru of at least one region is greater than Ro of the region;

if Fo is less than the maximum number of subchannels per symbol, increases, by one, a minimum number of subchannels necessary for transmitting a total number of slots for transmission of the second data burst in the power control region of the second data burst in which Ru is greater than Ro; and if Fo is greater than or equal to the maximum number of subchannels per symbol, subtracts a number of slots from a total number of slots for transmitting the second data burst, wherein the number of slots corresponds to a second PDU indicative of a minimum-priority PDU of the second data burst.

16. The system of claim 12, wherein the threshold includes a first threshold for separating the boosting region from the normal region, and a second threshold for separating the normal region from the deboosting region.

17. The system of claim 16, wherein the BS:
assigns the first data burst in the boosting region if the CINR of the MS is less than the first threshold;
assigns the first data burst in the normal region if the CINR of the MS is greater than the first threshold and less than the second threshold; and
assigns the first data burst in the deboosting region if the CINR of the MS is greater than the second threshold.

18. The system of claim 14, wherein the BS:
checks a power control region of the second data burst if there is a second data burst to be assigned and there is a slot to which data bursts are to be assigned;
determines if a second PDU indicative of a PDU with a minimum QoS priority of the second data burst can undergo segmentation, if N, where N is a number of slots for transmitting the second data burst in a third region indicative of a power control region of the checked second data burst, is greater than or equal to No, where No is a maximum number No of slots transmittable in the third region; and
segments the second PDU if the second PDU can undergo segmentation.

19. The system of claim 18, wherein if the second PDU cannot undergo segmentation, the BS subtracts a number of slots corresponding to the second PDU from a total number of slots for transmitting the second data burst.

20. The system of claim 18, wherein the BS:
if the second PDU cannot undergo segmentation, determines if a number of MAP symbols increases during assignment of the second data burst, when there is any remaining slot to which the second data burst is to be assigned;
if the number of MAP symbols does not increases, determines if a number of slots corresponding to the second PDU is subtracted from a total number of slots for transmitting the second data burst;
if the number of slots corresponding to the second PDU is subtracted from the total number of slots, assigns the second PDU to a remaining slot when there is the remaining slot to which no data burst is assigned in the third region indicative of the power control region of the second PDU; and
if there is a remaining slot, assigns a candidate data burst to the remaining slot in order of size.

21. The system of claim 20, wherein the BS:
after assigning the candidate data burst, if the number of MAP symbols does not increase, determines if there is another candidate data burst transmittable to the MS; and
if there is another candidate data burst and there is a remaining slot, assigns the another candidate data burst to the remaining slot.

22. The system of claim 20, wherein the candidate data burst is generated by concatenating PDUs with a same MCS level among PDUs with a highest MCS level of a data burst to be transmitted to the MS, in an order of a PDU with a highest QoS priority to a PDU with the lowest QoS priority.

* * * * *